Figure 1:
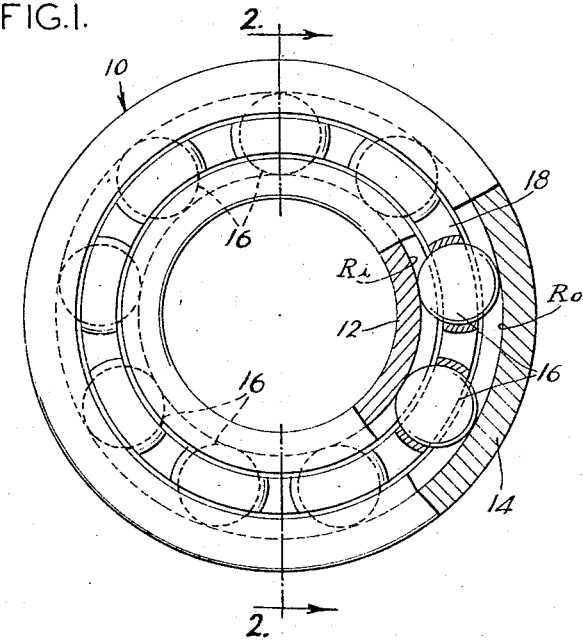

Dec. 20, 1966  O. G. GUSTAFSSON ETAL  3,292,980
ROLLING BEARINGS
Filed May 22, 1964

INVENTORS:
OLOF G. GUSTAFSSON
TIBOR E. TALLIAN
BY Howson & Howson
ATTYS.

3,292,980
Patented Dec. 20, 1966

3,292,980
ROLLING BEARINGS
Olof G. Gustafsson, Feasterville, and Tibor E. Tallian, Paoli, Pa., assignors to SKF Industries, Inc., King of Prussia, Pa., a corporation of Delaware
Filed May 22, 1964, Ser. No. 369,414
2 Claims. (Cl. 308—193)

This invention relates to improvements in rolling bearings and more particularly relates to a quiet running bearing assembly.

Among the factors contributing to bearing vibrations and hence a factor effecting the quiet running characteristics of a bearing are geometrical imperfections in elements of the assembly, such as ball and raceway waviness and raceway out of round which are characteristic of most ball bearing assemblies. As a practical matter, it is not commercially feasible to manufacture rolling bearing assemblies with an end to eliminating ball and raceway waviness and raceway out of round.

In order to minimize the vibration or noise effect, for example, of ball waviness, test apparatus of the type shown in Patent No. 2,997,791 have been employed to test balls for waviness. By use of the test device, balls with the smallest imperfections in relation to wave heights for all numbers of waves are selected or made so that the vibration or noise effect of the bearing so assembled is maintained at a minimum. A similar procedure is also used for race production. Of course, manufacturing refinements such as these add to the cost of production.

We have found that the bearing vibration may be reduced substantially especially in the low frequency range below, say, 1000 c.p.s by constructing the bearing assembly in accordance with a specific bearing configuration. More specifically it has been found that if the ratio of the outer ring thickness to the difference between the outer diameter of the outer ring and the bore diameter of the inner ring is equal to or greater than 0.5 and if the product of the ratio of the outer diameter of the outer ring less the bore diameter of the inner ring to the sum of the outer diameter of the outer ring and the bore diameter of the inner ring and the number of balls is equal to or greater than 5, this bearing exhibits extremely quiet running characteristics as compared with a bearing assembly of conventional design having substantially the same boundary dimensions and substantially the same geometrical imperfections such as ball and race waviness and raceway out of round. For example, tests have shown that the average low frequency reading (below, say, 1000 c.p.s.) of bearings made in accordance with the present invention is approximately one-half of the conventional bearing designs having substantially the same boundary dimensions and substantially the same geometrical imperfections. In other words, in the said low frequency band the vibration or noise level is reduced by about 50%. It has been found that in a large number of assemblies wherein bearings are employed, a significant factor contributing to the overall noise level of the assembly is the vibration of the bearing in the low frequency band (below, say, 1000 c.p.s.). Thus by employing a bearing constructed in accordance with the present invention characterized by a lower vibration in the low frequency range, the vibration of the entire assembly is reduced considerably.

It has been found that in bearing assemblies constructed in accordance with the present invention the level of rigid body vibrations generated by raceway and ball waviness is reduced as well as the flexural vibrations generated by low order raceway waviness. Further, the configuration of the bearing assembly in accordance with the present invention affects the vibration characteristic of the bearing in such a manner that the relative contribution from ball waviness as compared to raceway waviness is more important. Balls are easier and more economical to produce with low waviness than are rings and therefore this property of the proposed design is beneficial in obtaining quiet running bearings. Thus, if the ball waviness of a bearing constructed in accordance with the present invention is less than in a conventional bearing, the improvement in reduction of noise is even more pronounced.

With the foregoing in mind, the primary object of the present invention is to provide a bearing assembly having novel features of construction and arrangement providing an extremely quiet running assembly.

A further object of the present invention is to provide such a quiet running bearing assembly which is extremely economical to manufacture by conventional manufacturing and assembling procedures.

Figure 2:
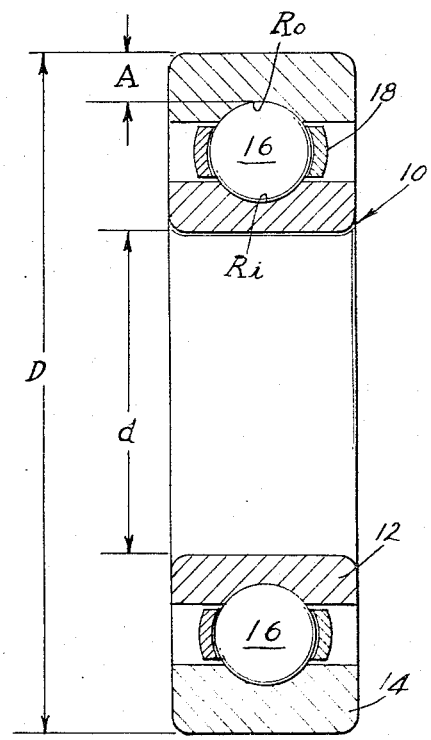

These and other objects of the present invention and the various features and details of the construction and arrangement thereof are hereinafter set forth with reference to the accompanying drawings, wherein:

FIG. 1 is a side elevational view partly in section of a bearing assembly constructed in accordance with the present invention; and FIG. 2 is an enlarged sectional view taken on lines 2—2 of FIG. 1.

Referring now to the drawing, there is illustrated a bearing assembly 10 constructed in accordance with the present invention. The bearing assembly 10 is a single row, deep groove ball bearing comprising the usual inner and outer rings 12 and 14 respectively having, in the present instance, arcuate raceways $R_i$ and $R_o$ to support in the annular space between the raceways a plurality of rolling elements which in the present instance are balls 16. The balls 16 are guided and maintained in circumferentially spaced apart relation by means of a cage 18.

While the present invention is illustrated in connection with a single row deep groove ball bearing, it is to be understood that the principle of the invention applies equally well to other types of rolling bearing assemblies.

In accordance with the present invention, the bearing assembly is characterized by a specific relationship of the elements thereof whereby an extremely quiet running bearing assembly is produced as compared with heretofore known bearing assemblies having substantially the same boundary dimensions and substantially the same geometrical imperfections such as ball and race waviness, and raceway out of round. More specifically, it has been found that vibration or noise effect of the bearing may be reduced considerably when the ratio of the minimum radial thickness, in the present instance, the wall thickness of the outer ring at the peak of the raceway $R_o$ designated by the letter A and the difference between the outer diameter D of the outer ring 14 and the bore diameter $d$ of the inner ring is not less than 0.15 and the product of the number of rolling elements 16 and the ratio of the difference between the outer diameter D of the outer ring 14 and the bore diameter $d$ of the inner ring 12 to the sum of the outer diameter D and the bore diameter $d$ is not less than 5. Still more specifically, it has been found that optimum quiet running characteristics of the bearing assembly especially in the low band frequency range result when the ratio of the radial thickness A of the outer ring to the difference between the outer diameter D and the bore diameter $d$ is greater than 0.15 and the product of the number of rolilng elements 16 and the ratio of the difference between the outer diameter D and the bore diameter $d$ to the sum of D and $d$ is greater than 5.

It has been found that the average low band frequency vibration frequency range below 1000 c.p.s. of bearings made in accordance with the present invention is approximately one-half the average low band frequency vibration of conventional bearing designs having substantially the same boundary dimensions and geometrical imperfections such as ball and raceway waviness and raceway out of round in the same order as bearings constructed in accordance with the present invention. The reduction of vibrations especially in the low frequency range is especially important in many applications in which rolling bearing assemblies operate. Thus, in many applications where rolling bearing assemblies are employed such as in machine tools, electric motors and the like, a significant contributory factor with regard to noise and vibration in the entire system is induced by vibration of the bearing in the low band frequency range. Thus, if this vibration can be minimized, the vibration level or noise of the entire assembly may be reduced considerably. This is possible with bearings constructed in accordance with the present invention.

While a particular embodiment of the present invention has been illustrated and described herein, it is of course, to be understood that slight changes and modifications may be made therein within the scope of the following claims.

We claim:

1. A rolling bearing assembly comprising an outer ring, having a raceway, an inner ring having a raceway spaced from the outer ring, a plurality of rolling elements in the annular space between the raceways of the rings, the respective relationship of the elements of the bearing assembly being in accordance with the following formulas;

$$\frac{A}{D-d} \geqq 0.15$$

$$Z\left[\frac{D-d}{D+d}\right] \geqq 5$$

where $A$ = the minimum thickness of the outer ring at the raceway,
$D$ = the outer diameter of the outer ring
$d$ = the bore diameter of the inner ring
$Z$ = the number of rolling elements.

2. A rolling bearing assembly comprising an outer ring, an inner ring spaced from the outer ring to define an annular space therebetween, a plurality of balls in the annular space between the rings, the ratio of the minimum radial thickness of said outer ring to the difference between the outer diameter of the outer ring and the bore diameter of the outer ring and the bore diameter of the inner ring being not less than 0.15 and the product of the number of balls and the ratio of the difference between the outer diameter of the outer ring and the bore diameter of the inner ring and the sum of the outer diameter of the outer ring and the bore diameter of the inner ring being not less than 5.

References Cited by the Examiner

Technical Memo #3 by Barden Corporation, Danbury, Conn.

New Departure Handbook, 2nd Edition, September 1935, page 53 relied on.

EDGAR W. GEOGHEGAN, *Primary Examiner.*

FRANK SUSKO, *Examiner.*

UNITED STATES PATENT OFFICE
CERTIFICATE OF CORRECTION

Patent No. 3,292,980                      December 20, 1966

Olof G. Gustafsson et al.

It is hereby certified that error appears in the above numbered patent requiring correction and that the said Letters Patent should read as corrected below.

Column 1, line 13, for "effecting" read -- affecting --; line 25, for "in relation to" read -- are expressed by --; line 38, for "0.5" read -- 0.15 --; line 68, before "rigid" insert -- low frequency --; column 2, line 2, for "ball waviness as compared to raceway" read -- raceway waviness as compared to ball --; line 50, for "effect" read -- level --; line 52, after "radial" insert -- outer ring --; line 68, for "rolilng" read -- rolling --; line 71, strike out "band"; column 3, line 1, after "vibration" insert -- in the --; lines 3 and 16, strike out "band", each occurrence.

Signed and sealed this 26th day of September 1967.

(SEAL)
Attest:

ERNEST W. SWIDER                      EDWARD J. BRENNER
Attesting Officer                    Commissioner of Patents